No. 890,378. PATENTED JUNE 9, 1908.
A. G. SCHÜNZEL.
CULTIVATOR.
APPLICATION FILED JAN. 18, 1908.
2 SHEETS—SHEET 1.
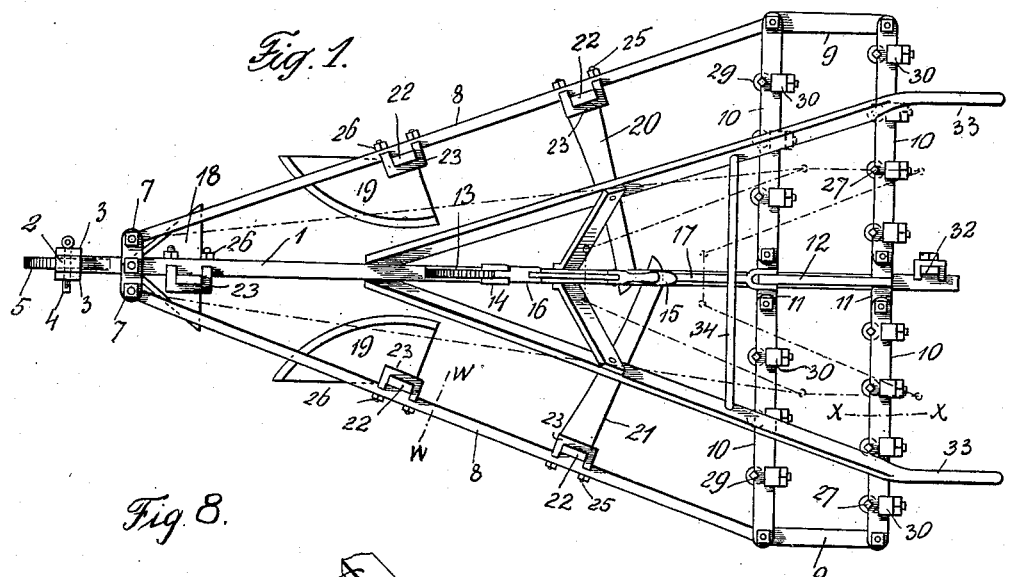
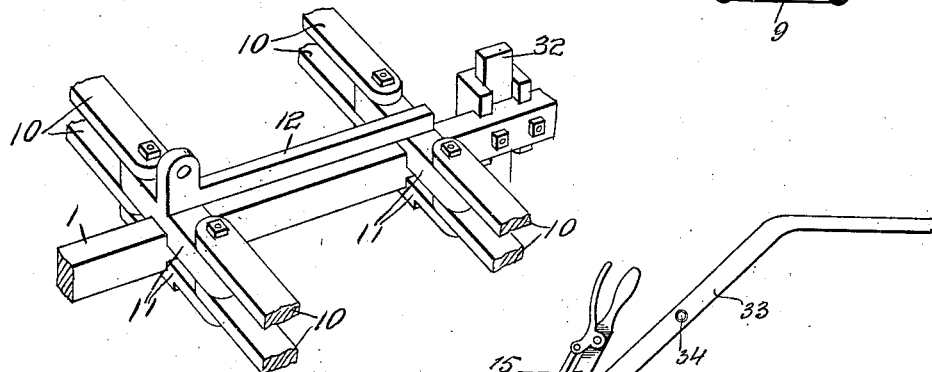
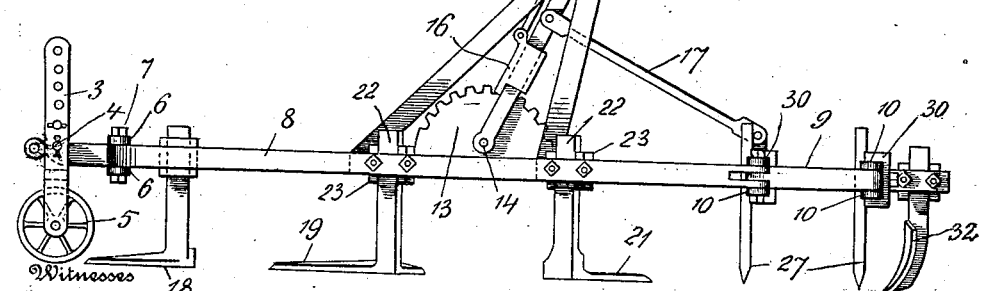
Witnesses
A. H. Rabsag,
Inventor:
A. G. Schünzel,
By H. C. Evert
Attorneys

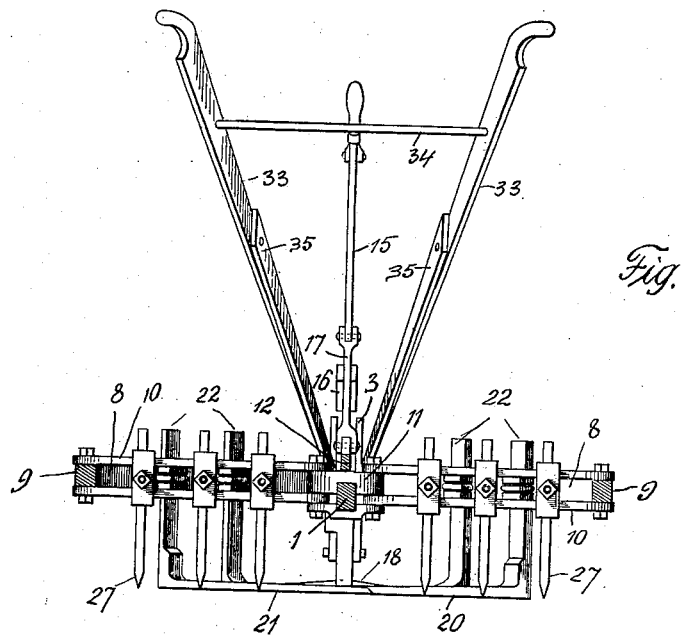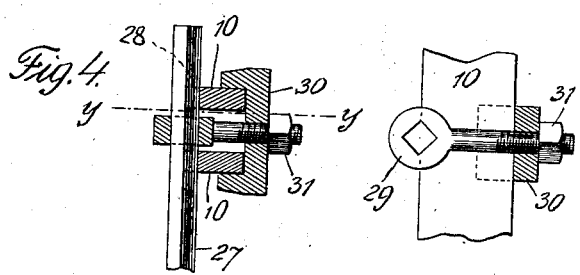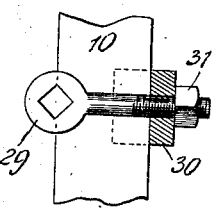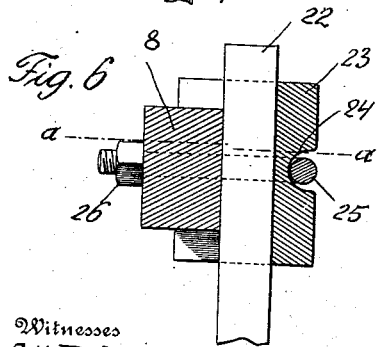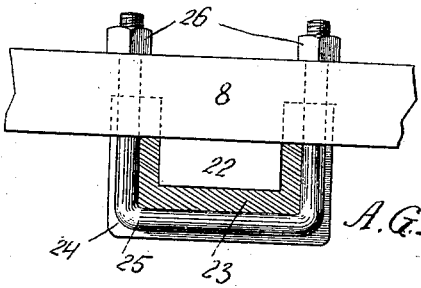

UNITED STATES PATENT OFFICE.

ALFRED G. SCHÜNZEL, OF PITTSBURG, PENNSYLVANIA.

CULTIVATOR.

No. 890,378.    Specification of Letters Patent.    Patented June 9, 1908.

Application filed January 18, 1908. Serial No. 411,511.

*To all whom it may concern:*

Be it known that I, ALFRED G. SCHÜNZEL, a subject of the Emperor of Germany, residing at North Side, Pittsburg, in the county of Allegheny and State of Pennsylvania, have invented certain new and useful Improvements in Cultivators, of which the following is a specification, reference being had therein to the accompanying drawing.

This invention relates to cultivators, and the object of the invention is to provide a novel implement for garden work, the implement being easily adjusted to conform to the width of the space between rows or groups of vegetables.

To this end, I have devised a simple and inexpensive cultivator having a plurality of horizontal cutter blades for cutting grass and weeds that grow between rows of vegetables or in the paths of a garden. The instrument is provided with a plurality of adjustable teeth adapted to follow in the path of the above mentioned cutter blades and agitate the soil to such a degree as to break any clods or incrustations.

My cultivator will be presently described in detail, and reference will now be had to the accompanying drawings, wherein, Figure 1 is a plan of a cultivator constructed in accordance with my invention, Fig. 2 is a side elevation, Fig. 3 is a rear elevation partly in section, Fig. 4 is a cross sectional view taken on the line $x$—$x$ of Fig. 1, Fig. 5 is a horizontal sectional view taken on the line $y$—$y$ of Fig. 4, Fig. 6 is a cross sectional view taken on the line $w$—$w$ of Fig. 1, and Fig. 7 is a horizontal sectional view taken on the line $a$—$a$ of Fig. 6, with the shank of the cutter blade shown in plan. Fig. 8 is a detail perspective view of a part of the cultivator, showing the sliding heads by means of which the width adjustment of the cultivator is effected.

To put my invention into practice, I provide a center beam 1, the forward end of which is provided with an eyelet 2, whereby a single or double tree (not shown) can be attached to the beam in order that the implement can be moved by a horse or by a traction power. The forward end of the beam is secured between the apertured arms of a standard 3 adjustably connected to the beam by a pin 4. In the lower end of this standard is journaled a bearing wheel 5 adapted to support the forward end of the cultivator, when the same is moved over the ground.

Secured to the beam, near the forward end thereof, are two transverse plates 6, and between these plates are pivotally connected by nuts and bolts 7, the forward ends of side frames 8, these frames having their rear ends pivotally connected to links 9, which in turn are connected to two sets of movable bars 10. The bars 10 are pivotally connected at their inner ends to two heads 11, slidably mounted upon the center beam 1 and connected together by a strap 12.

The center beam 1 intermediate its ends is provided with a semi-circular rack 13, and pivotally connected to said rack, as at 14, is an operating lever 15, said lever having a gravity pawl 16 for engaging the rack 13, and holding the operating lever in an adjusted position. The operating lever 15 is connected by a rod 17 to the forward end of the strap 12, and by adjusting the lever 15, the heads 11 can be moved back and forth and the side frames 8 swung outwardly or inwardly towards the center beam 1. This adjustment is illustrated by dotted lines in Fig. 1 of the drawings.

The center beam 1 and the side frames 8 are provided with cutter blades, the center beam 1 being provided with a spear shaped blade 18, the side frames 8 with curved blades 19 having confronting cutting edges, also with oblong blades 20 and 21, the blade 20 lying in advance of the blade 21. All of these blades are provided with shanks 22, which are held in engagement with the center beam 1 and the side frames 8 by yoke blocks 23 having grooves 24 for a yoke bolt 25, that extends through the center beam 1 and the side frames 8 and is held in position by nuts 26. The blades 18 to 21 inclusive can be raised or lowered with respect to their supports and the wheel 5, by loosening the nuts 26, adjusting the shanks of the blades in the yokes, and then tightening the nuts to hold the plates in adjusted position.

Secured to the bars 10 are a plurality of teeth 27, substantially square in cross section, whereby they will fit in notches 28 provided therefor in the bars 10. The teeth extend through eye bolts 29 which are held in engagement with the bars 10 by clips 30 and nuts 31. The teeth of the rearmost bars 10 are arranged in staggered relation to the teeth of the front bars. The rear end of the center beam is provided with a plow point or a shovel 32 held in engagement with the beam 1 in a manner similar to that employed for securing the blades 18 and 21 inclusive.

Secured to the center beam 1 adjacent to the rack 13 are two handles 33, connected by a rod 34 and braced by straps 35 which are connected to the handles and to the center beam 1.

It will be observed that I have devised a novel cultivator having independent adjustable blades and teeth, which are supported, whereby said blades and teeth can be simultaneously moved to traverse a narrow strip of land or a broad strip. The adjustment of the implement is only limited by the movement of the heads 11 upon the center beam 1, and when the implement is made of a considerable length, the side frames 8 can be swung outwardly, whereby a large area of soil will be cultivated.

My invention is susceptible to such changes as are permissible by the appended claims.

Having now described my invention what I claim as new, is:—

1. A cultivator of the type described embodying a center beam, and an adjustable wheel carried by the forward end of said beam, an adjustable plow blade carried at the rear end of said beam, side frames pivotally connected to the forward end of said beam, a plurality of adjustable cutter blades carried by said side frames, heads slidably mounted upon said beam near the rear end thereof, sets of cross bars connecting said heads with said side frames, a plurality of adjustable teeth carried by said cross bars, the teeth of one set of bars being arranged out of line with the teeth of the other set of bars, an operating lever arranged above said beam and connected to said heads for shifting the latter on the beam, handles supported from said beam, and means to retain said operating lever in a fixed position.

2. A cultivator of the type described comprising a center beam, a wheel adjustably supported at the forward end of said beam, side frames pivotally connected to the forward end of said beam, a plurality of cutter blades adjustably supported by said side frames, heads slidably mounted upon said beam, sets of cross bars connecting said heads with said side frames, a plurality of adjustable teeth carried by said sets of cross bars, the teeth of one set of bars being arranged out of line with the teeth of the other set of bars, handles supported by said beam, and means arranged above said beam and connecting with said heads for shifting the heads on the beam and shoulder adjusting said cross bars and side frames.

3. A cultivator comprising a beam, side frames pivotally connected thereto, a plurality of adjustable blades carried by said side frames, a pair of heads slidably mounted upon said beam, a strap connecting said heads whereby they move in unison, cross bars connecting each head with said side frames, a plurality of adjustable teeth carried by said bars, handles supported by said beam, and means arranged above said beam and connected to said strap for shifting the heads on the beam and thereby adjusting the cross bars and side frames.

4. A cultivator comprising a beam, side frames pivotally connected thereto, a plurality of adjustable blades carried by said side frames, a pair of heads slidably mounted upon said beam, a strap connecting said heads, cross bars connecting said heads with said side frames, a plurality of adjustable teeth carried by said cross bars, and means arranged above said beam and connected with the heads for shifting the latter on the beam and thereby adjusting the cross bars and side frames.

In testimony whereof I affix my signature in the presence of two witnesses.

ALFRED G. SCHÜNZEL.

Witnesses:
  A. H. RABSÁG,
  MAX H. SROLOVITZ.